United States Patent [19]

Shibata et al.

[11] Patent Number: 5,008,817
[45] Date of Patent: Apr. 16, 1991

[54] METHOD AND APPARATUS FOR TRANSFERRING ADDRESSES AND INFORMATION IN A BUFFER MEMORY AND A COMMON MAIN STORAGE DEVICE

[75] Inventors: Masabumi Shibata; Akira Ishiyama; Takeshi Takemoto, all of Hadano, Japan

[73] Assignee: Hitachi, Ltd., Tokyo, Japan

[21] Appl. No.: 222,841

[22] Filed: Jul. 22, 1988

[30] Foreign Application Priority Data

Jul. 24, 1987 [JP] Japan ............................ 62-183721

[51] Int. Cl.⁵ .............................................. G06F 9/00
[52] U.S. Cl. ................................. 364/200; 364/239; 364/239.6; 364/240; 364/266.3
[58] Field of Search .......................... 364/200, 900

[56] References Cited

U.S. PATENT DOCUMENTS

| | | | |
|---|---|---|---|
| 4,486,834 | 12/1984 | Kobatashi et al. | 364/200 |
| 4,590,554 | 3/1986 | Glazer et al. | 364/200 |
| 4,622,631 | 11/1986 | Frank et al. | 364/200 |
| 4,654,819 | 3/1987 | Stiffler et al. | 364/200 |

FOREIGN PATENT DOCUMENTS

61-112258  5/1986  Japan .

Primary Examiner—Gareth D. Shaw
Assistant Examiner—John G. Mills
Attorney, Agent, or Firm—Fay, Sharpe, Beall, Fagan, Minnich & McKee

[57] ABSTRACT

Provided is an information processing apparatus in which at least two processing units each having a buffer memory are mutually connected to each other and to a main storage unit through a bus. All of the processing units having the buffer memories continuously monitor the state of the bus. When one of the processing units generates an information updating request in order to update the storage content of the main storage unit, the other processing units read a memory address from the bus. The memory address corresponds to the information to be updated, and is sent to the main storage unit through the bus together with the information updating request. The memory address is compared with memory addresses contained in the buffer memory of the other processing units. If there is a coincidence, information in the relevant memory address exists in its own buffer memory. Thereafter this information is invalidated.

17 Claims, 6 Drawing Sheets

FIG. 7C

METHOD AND APPARATUS FOR TRANSFERRING ADDRESSES AND INFORMATION IN A BUFFER MEMORY AND A COMMON MAIN STORAGE DEVICE

BACKGROUND OF THE INVENTION

The present invention relates to an information processing apparatus in which a plurality of processing units having buffer memories use a common main storage device, wherein requests by the processing units to update process information stored in the main storage device can be promptly executed without lowering the speed or accuracy of the information processing apparatus.

A method of using a buffer memory is known for reducing access time to a main storage device shared by the processing units of an information processing apparatus. According to this method, a high speed buffer memory whose capacity is smaller than that of the main storage device is arranged between the processing unit and the main storage device. A copy of information stored in the main storage device which was accessed by the processing unit is then stored in the buffer memory. When the processing unit again accesses the main storage device in this state, a check is first made to see if information to be accessed exists in the buffer memory. If it exists, the information is supplied from the buffer memory without accessing the main storage device, thereby apparently reducing the access time to the main storage device.

If in the above information processing apparatus, one of the processing units updates information for a certain memory address in the main storage device, the information corresponding to this memory address which already exists in the buffer memory of another processing unit will no longer coincide with the information found the main storage device. Thus, obviously, information located in the buffer memory which has not been updated will be inaccurate and therefore lead to false results when used for further information processing.

Therefore, in the conventional information processing apparatus, when the content of the main storage device is updated, the processing unit which is updating information sends an information updating request to the main storage device, along with a memory address at which the information to be updated is located, data, and other information. When the main storage device receives the information updating request, it updates the storage content in the designated memory address. After completion of the updating, the main storage device sends an invalidation command to invalidate the information located at the certain memory address in any buffer memory other than the buffer memory sending the request to update the information. The invalidation signal uses the same bus which was used to send the information updating request.

An example of the above discussed conventional technique is disclosed in JP-A-61-112258.

However, in such a conventional technique the same bus is used to send the information updating request to the main storage device from the processing unit, and to send the command to invalidate the non-updated information stored in the other buffer memories.

Therefore, for the time interval when the main storage device sends the invalidation command to the other processing units, access to the main storage device is foreclosed to all of the processing units. This causes the problem that each of the processing units must wait until the bus becomes free, thus causing a deterioration in the processing performance of the information processing apparatus.

SUMMARY OF THE INVENTION

It is an object of the present invention to solve the problems of the conventional techniques mentioned above and to provide an information processing apparatus in which the transmission from a main storage device, of an address requesting invalidation of information stored in buffer memories of processing units becomes unnecessary. Thereby eliminating the bus waiting time of processing unit and preventing deterioration of the processing performance of the processing apparatus.

According to the present invention, this object is accomplished by constructing an information processor apparatus such that all of the processing units which have buffer memories, and which commonly use a main storage device, continuously monitor the state of a bus. Thus when one of the processing units generate an information updating request for updating the storage content of the main storage device, the other processing units read the memory address to be updated, which is sent together with the information updating request to the main storage device through the bus, and if information in this memory address exists in its own buffer memory, this information is invalidated.

As stated above, each of the processing units continuously monitor the state of the bus. When the information updating request is sent from one of the processing units to the bus, the memory address to be updated is read simultaneously by the other processing units. If one of the processing unit which read the memory address had the same address in its buffer memory that processing unit has that information invalidated. Therefore, each processing unit can cause the information in the buffer memory in other units to coincide with the information in the main storage device without needing a request for invalidation from the main storage device. In addition, since the bus is not used for purposes other than to access the main storage device by the processing units, the processing performance of the information processing apparatus can be improved.

DESCRIPTION OF THE PREFERRED EMBODIMENTS

Embodiments of the information processing apparatus according to the present invention will be described in detail hereinbelow with reference to the drawings.

Figure 1:
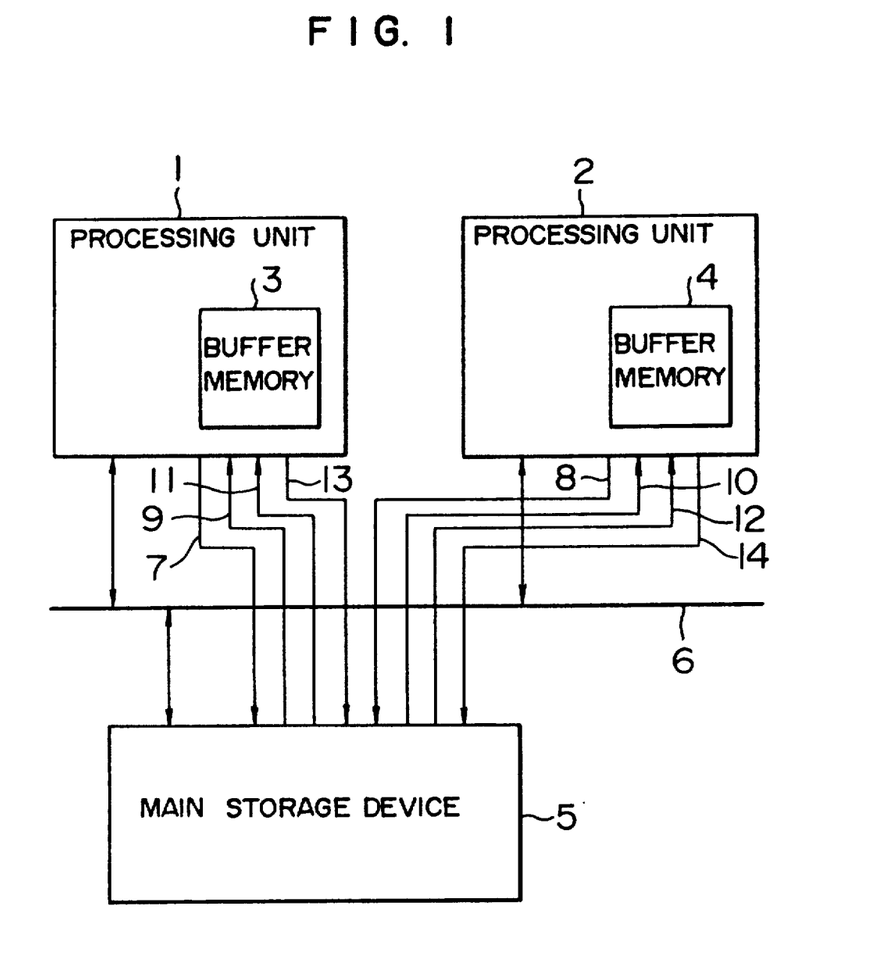
FIG. 1 is a block diagram of an embodiment of an information processing apparatus according to the present invention.
Figure 2:
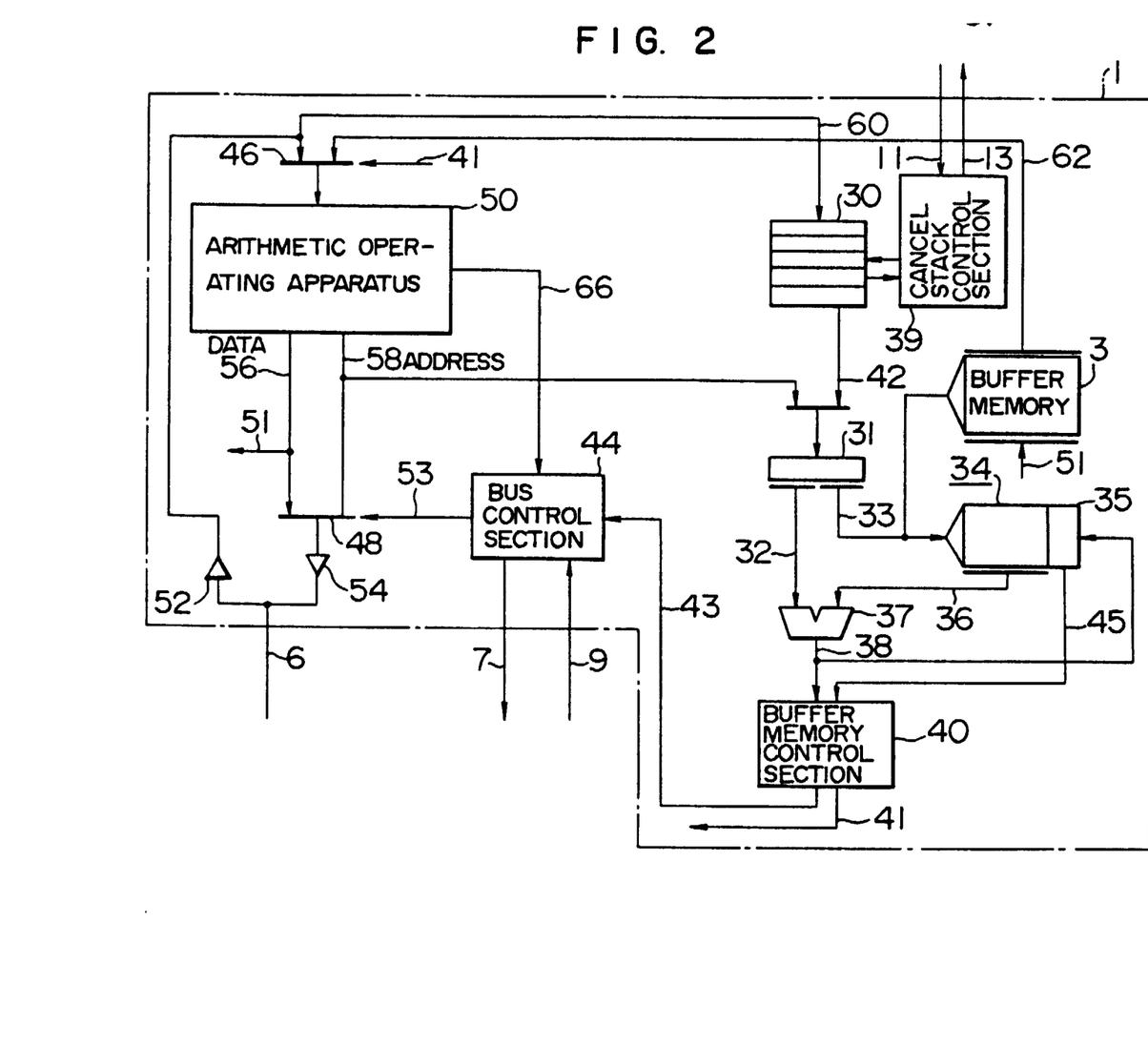
FIG. 2 is an arrangement diagram of an example of one processing unit in FIG. 1.

FIG. 1 is a block diagram showing a system configuration of an embodiment of the invention. FIG. 2 is a block diagram showing an internal arrangement of a typical example of a processing unit 1 of FIG. 1.

In FIG. 1, reference numerals 1 and 2 denote processing units; 3 and 4 indicate buffer memories; 5 shows a main storage device; 6 a bus; 7 and 8 bus use request lines; 9 and 10 bus use accept lines; 11 and 12 cancel request lines; and 13 and 14 write access suppress lines.

In FIG. 2, reference numeral 30 denotes a cancel stack register; 31 an address register; 32 an address upper bit portion output line; 33 an address lower bit portion output line; 34 an address array memory; 35 a valid flag area; 36 a partial address output line; 37 a comparator; 38 an address coincidence output line; 39 a cancel stack control section; 40 a buffer memory control section; 41 buffer output selection signal line; 42, 46 and 48 selectors; 43 a read request line; 44 a bus control section; 45 a flag valid line; 50 an arithmetic operating apparatus; 51 a data line; 52 and 54 buffers; 53 a control signal line to control the selector 48; 56 a data line; 58 an address line; 60 a signal line to send data or the like from the bus 6; 62 a read signal line to send the data read out of the buffer memory 3; and 66 a storage notification line.

Figure 3:
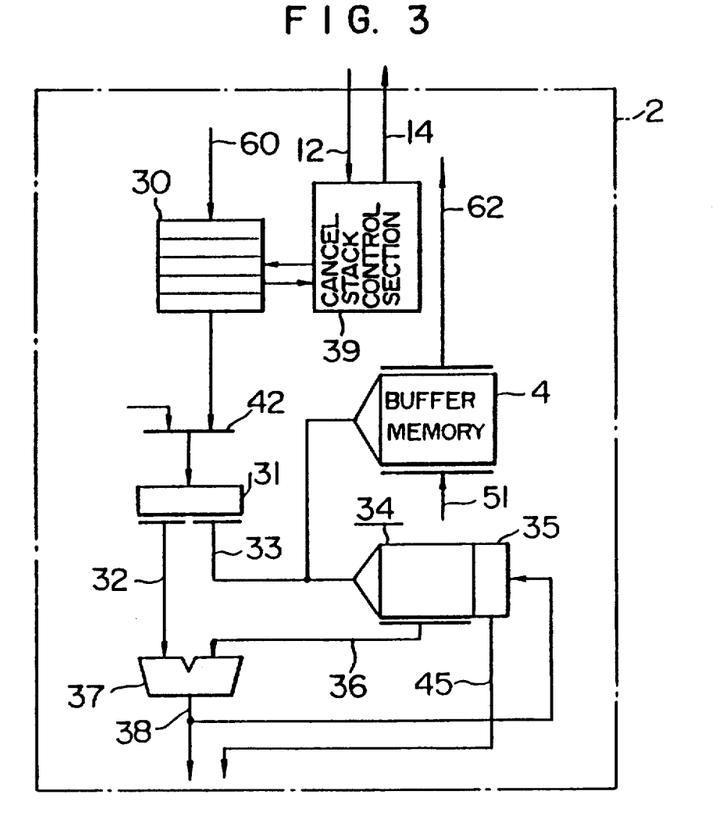
FIG. 3 is an arrangement diagram of the main section in an example of a second processing unit in FIG. 1.

The processing unit 2 is constituted in a manner similar to that shown in FIG. 2 and an arrangement of the main section of the processing unit 2 is shown in FIG. 3. In the diagram, the parts and components having the same functions as those in FIG. 2 are designated by the same reference numerals.

Figure 4:
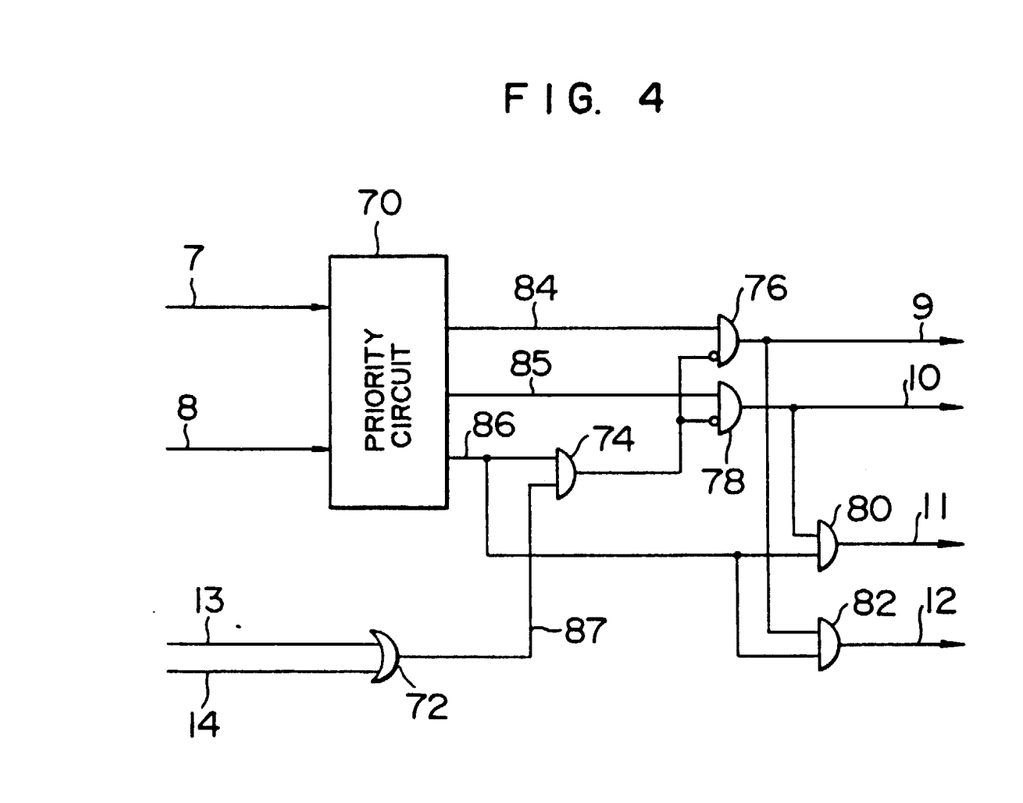
FIG. 4 is an arrangement diagram of the main section of a main storage device in FIG. 1.

FIG. 4 is a circuit diagram of the main section of the main storage device. In the diagram, reference numeral 70 denotes a priority circuit; 72 an OR gate; and 74, 76, 78, 80, and 82 AND gates. One input of each of the AND gates 76 and 78 is an inverting input.

As shown in FIG. 1, the system in the foregoing embodiment of the invention comprises; the processing units 1 and 2 having respectively the buffer memories 3 and 4 therein; the main storage device 5; and the bus 6. The processing units 1 and 2 commonly access the main storage device 5 through the bus 6. To control the main storage device 5, the processing units 1 and 2 and main storage device 5 are connected by the bus use request lines 7 and 8, bus use accept lines 9 and 10, cancel request lines 11 and 12; and write access suppress lines 13 and 14.

Although FIG. 1 shows an example in which two processing units have buffer memories provided, the invention can be also applied to the case where three or more processing units have buffer memories provided.

Operations in the information processing apparatus having such a construction will now be described in more detail with reference to FIGS. 1 and 2.

The reading operation of the buffer memory 3 will be explained briefly. When an address is stored into the address register 31 from the arithmetic operating apparatus 50 through the address line 58 and selector 42, for example, a lower bit output of the address is given to the buffer memory 3 through the address lower bit output line 33 and data is given to the read signal line 62 from buffer memory 3. The lower bit output is also given to the address array memory 34. These lower bits allow a partial address to be read out onto the partial address output line 36 from address array 34.

The address array memory 34 serves as part of the buffer memories 3 and 4 and contain some of the memory addresses stored in the main storage device. These addresses correspond to the information stored in the buffer memories and a valid flag concerned therewith. In this example the partial address read out of the address array memory 34 corresponds to the upper bits in the memory address. This partial address and the address upper bit portion set in the address register 31 are respectively given to the comparator 37 through the partial address output line 36 and the address upper bit portion output line 32. If they coincide as the result of the comparison by comparator 37, an address coincidence signal is output to the address coincidence output line 38.

This signal means that the address set in the address register 31 exists in the buffer memory and the storage information exits at this memory address in the buffer memory. The address coincidence output from the comparator 37 is given to the valid flag area 35 in the corresponding address array memory 34. If the flag corresponding to this memory address is valid, a signal is output to the flag valid line 45 and is given to the buffer memory control section 40. Then, the control section 40 outputs a signal to the buffer data read out on the signal line 62 is selected by the selector 46 and given to the arithmetic operating apparatus 50.

If the flag is invalid, the buffer memory control section 40 outputs onto the read request line 43 a read request signal for the main storage device 5, which goes through to the bus control section 44, so that data is read out of the main storage device 5 and is given to the arithmetic operating apparatus 50 through bus 6, buffer 52, and selector 46.

An explanation will now be made with respect to the case where processing unit 1 updates the information in a certain memory address in the main storage device 5. The processing unit 1 first request the use of the bus 6 in order to update the information in the main storage device 5 by using the bus use request line 7 to access the main storage device 5. When the main storage device 5 receives this request, it sends this request to the priority circuit 70 (FIG. 4). When requests from processing units 1 and 2 are sent through the bus use request lines 7 and 8 simultaneously, the priority circuit 70 executes the process based on the request having the higher priority.

Assuming that the request from the processing unit 1 is processed, the signal levels of the signal lines 84, 85 and 86 are set to "1", "0", and "1", respectively. Write access suppress lines 13 and 14 provide low level signals "0" to permit the write access. Accordingly, outputs of the AND gates 76 and 82 are set to the high level "1" and outputs of the AND gates 78 and 80 are set to the low level "0".

That is, the main storage device 5 sends a bus use permission signal (i.e., "1" at output 76) to the bus control section 44 of the processing unit 1 through the bus use accept line 9. Then, the bus control section 44 gives a control signal to the selector 48 through the control line 53. The selector 48 sends to the bus 6 the information to be updated on the data line 56 and the memory address to be updated on the address line 58.

Therefore, the information in the main storage device 5 is updated on the basis of the information sent through bus 6.

In the foregoing operation, when the main storage device 5 sends a bus use permission signal to the processing unit 1 through the bus use accept line 9, the main storage device 5 simultaneously sends a cancel request signal to the processing unit 2 from the AND gate 82 through the cancel request line 12. Upon reception of the cancel request signal, the processing unit 2 shown in FIG. 3 reads out through the signal line 60 the memory address outputted onto the bus 6. As mentioned above, this memory address is nothing but the memory address to update the storage information in the main storage device 5 by the processing unit 1. The processing unit 2 compares this memory address with the memory address of the information stored in the buffer memory 4 of processing unit 2. When the information having this memory address exists in the buffer memory 4, the processing unit 2 invalidates this content.

To execute this invalidating process, as shown in FIGS. 2 and 3, the processing units have: the cancel stack register 30; address register 31; address array memory 34 having a valid flag; and comparator 37.

In FIG. 3, when a cancel request signal is given to the processing unit 2 from the main storage device 5 through the cancel request line 12, the cancel stack control section 39 writes int the cancel stack register 30 the memory address which was sent from the processing unit 1 to update the storage information in the main storage device 5 as a cancel address from the bus 6 through the signal line 60. The cancel addresses written in the register 30 in this manner are set into the address register 31 one by one. A partial address is read out of the address array memory 34 by the address lower bit portion output line 33.

Both the partial address and the upper bits of the cancel address are given to the comparator 37. If they coincide as the result of the comparison by the comparator 37, this means that the cancel address set in the address register 31 exists in the buffer memory and the storage information exists in this memory address in the buffer memory. The address coincidence output from the comparator 37 is given to the valid flag area 35 through the address coincidence output line 38. By invalidating the valid flag (as disclosed below) in the address array memory 34 corresponding to this memory address, the storage information in this memory address in the buffer memory is invalidated.

The cancel stack register 30 is a buffer register which is provided to efficiently execute the foregoing invalidating operation. This register can temporarily hold a plurality of unprocessed cancel addresses in the case where a number of processing units which commonly use the main storage device 5 exist and an information updating speed to the main storage device 5 is higher than an invalidating operating speed of the buffer memory. When a predetermined number of cancel addresses have been stored into the cancel stack register 30, the cancel stack control 39 detects it and outputs a high level signal onto the write access suppress line 13 to inhibit the use of the bus 6 for the purpose of the updating of the storage information in the main storage device. This prevents the cancel stack register 30 form overflowing.

That is, in FIG. 4, when the high level signal is given to the write access suppress line 13, it is given to the AND gate 74 through the OR gate 72. Thus, in the writing operation, an output of the AND gate 74 is set to the high level "1", thereby inhibiting the outputs of the AND gates 76 and 78. Namely, the bus use permission signal it inhibited from being given to the processing units 1 and 2 via lines 9 and 10. This also applies to the case where the high level signal is output from the processing unit 1 to the write access suppress line 14.

Figure 5:
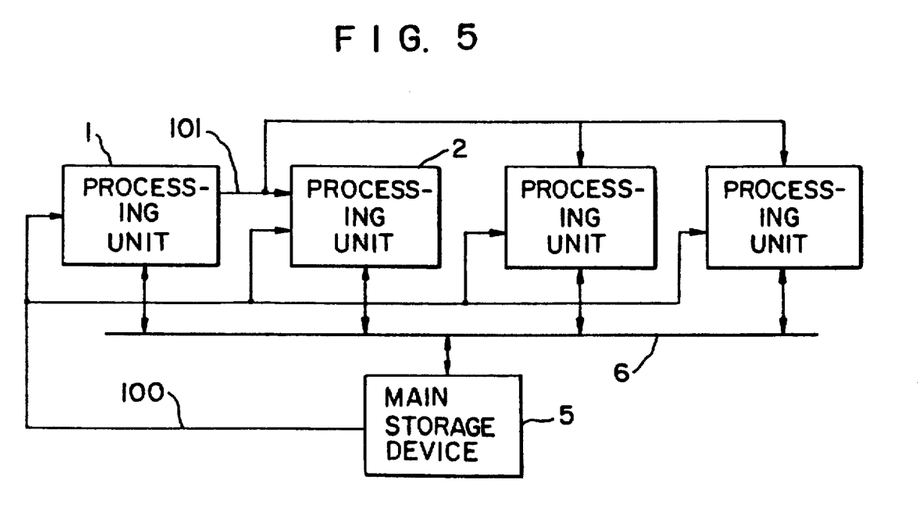
FIG. 5 is a block diagram of another embodiment of the invention.

The second embodiment of the present invention will now be described through the use of FIG. 5. In this embodiment, signal lines 100 and 101 are use din place of the signal lines 7 and 14 in FIG. 1. In the first embodiment, when the processing unit generates a bus use request signal to the main storage device 5, the main storage device 5 gives a bus use permission signal (via lines 9 and 10) and also sends a cancel request signal to the other processing units. Then, in response to the bus use permission signal, the processing unit outputs both the updating information and the memory address of the information to be updated to the bus 6.

On the other hand, in the second embodiment, the processing unit directly outputs both the updating information and the memory address to be updated to the bus 6.

Figure 6:
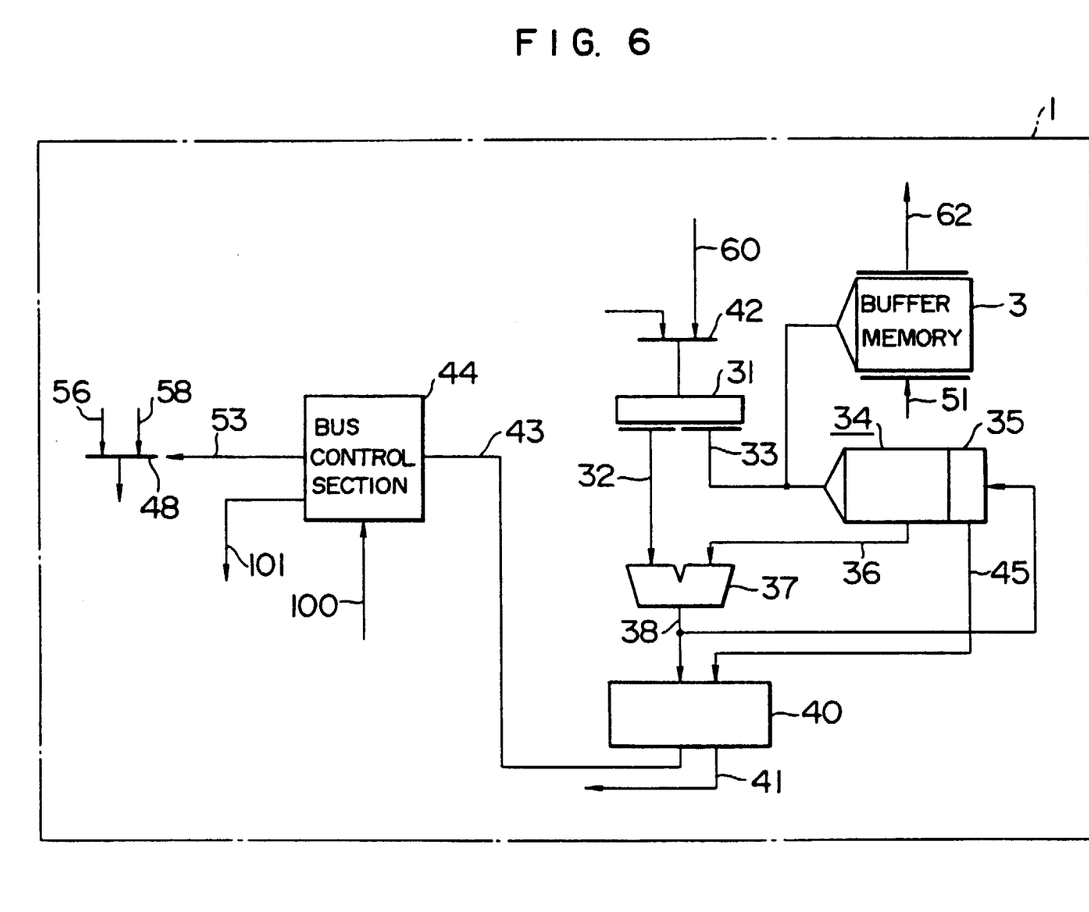
FIG. 6 is an arrangement diagram of the main section in an example of a processing unit in the embodiment of FIG. 5.

FIG. 6 is an arrangement diagram of the main section of an example of the processing unit 1 in the present embodiment. In the processing unit 1 of this embodiment, the cancel stack register 30 and cancel stack control section 39 in the first embodiment are not provided rather an address from the bus 6 is directly given to the selector 42 through the signal line 60. On the other hand, the signal line 100 is connected to the bus control section 44. The signal line 101 transmits a bus using signal from the bus control section 44 to other processing units when unit 1 uses the bus 6. Only the signal line 100 is inputted to the bus control section 44 of processing unit 1. The signal lines 100 and 101 are both inputted to the bus control section 44 of the processing unit 2.

If the main storage device 5 uses the bus 6 for transferring the data and address to unit 1 or 2, the main storage device 5 outputs a bus using signal to the signal line 100. When no bus using signal exists on the signal line 100, the processing unit 1 can execute the updating operation using the bus. In the operation using the bus, the processing unit 1 outputs a bus using signal to the signal line 101. When no bus signal exists on the signal lines 100 and 101, the processing unit 2 is permitted to use the bus and can perform the updating operation. That is, in this example, it is assumed that the priorities are lowered in accordance with the order of the main storage device 5 and processing units 1 and 2. Each of the processing units outputs a control signal to the control signal line 53 by the bus control section 44 in the updating operation and outputs both the updating information and the memory address of the information to be updated to the bus 6 by the selector 48. Then, the other processing units invalidate the relevant information corresponding to the memory address of the information to be updated.

Figure 7A:
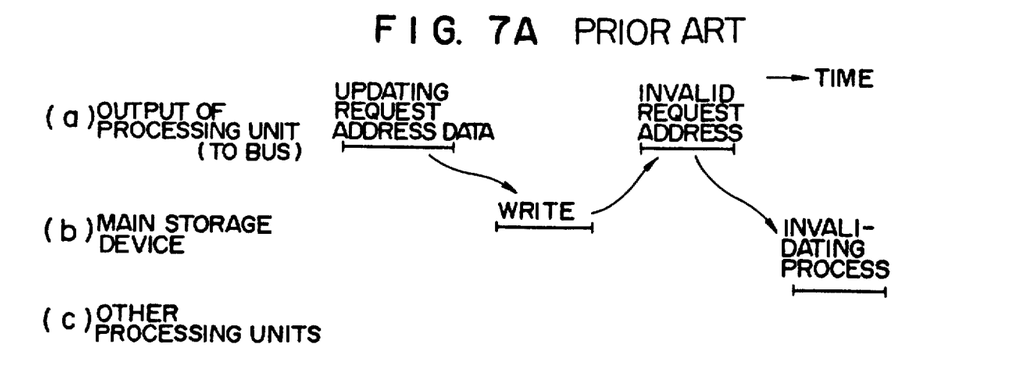
FIGS. 7A, 7B, and 7C are diagrams for explaining the operations of a conventional information processing apparatus and of the information processing apparatuses of the present invention.
Figure 7B:
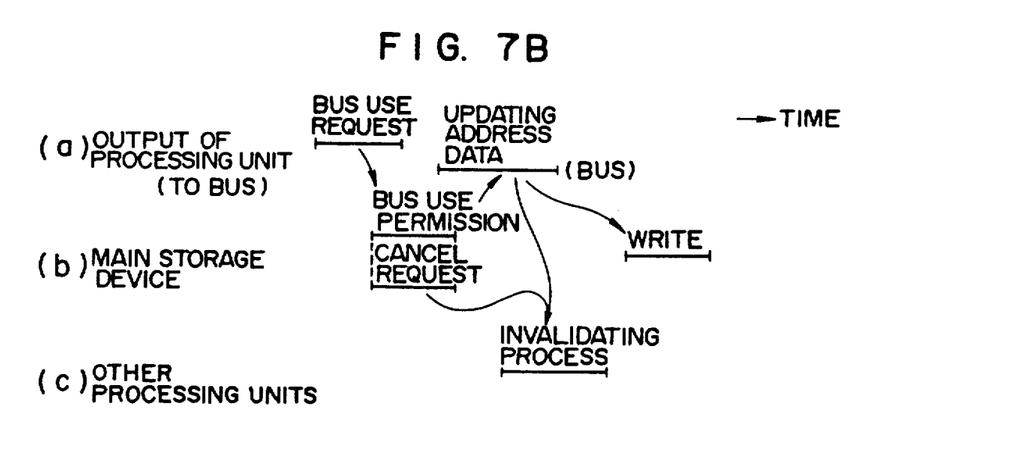
Figure 7C:
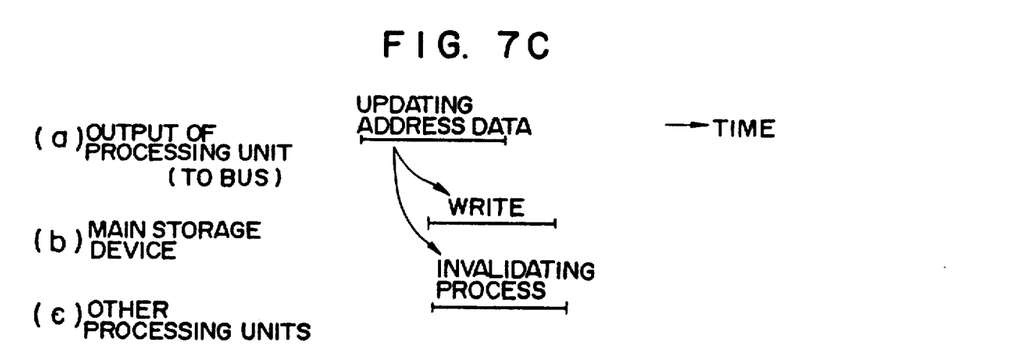

FIGS. 7A, 7B, and 7C show the signals, data and flow of the processes in the updating operations in the foregoing conventional information processing apparatus and in the first and second embodiments of the present invention, respectively.

According to the embodiments of the invention mentioned above, there is no need to use the bus for only the invalidating process of the buffer memory. Therefore, the processing efficiency of each processing unit can be improved and the processing performance of the whole system can be improved.

In addition, in the foregoing embodiments of the invention, one main storage device 5 has been commonly used by two processing units 1 and 2. However, the present invention can be also applied to the case where many processing units of similar arrangements commonly use one main storage device or to a processing apparatus where the processing units do not contain buffer memories.

As described above, during the updating process between the buffer memory and the information of the main storage device, the address of the memory locations to be updated is taken in by the other processing units, thereby allowing the invalidation of invalidating the information corresponding to that memory address. Therefore, there is no need to send the information for invalidation from the main storage device onto the bus, so that the system performance can be remarkably improved.

We claim:

1. An information processing apparatus comprising:
   a bus;
   a main storage device connected to said bus, said main storage device containing updatable information and addresses corresponding to said information,
   a plurality of processing units connected to said bus such that said processing units continuously monitor the bus, each one of said processing units including a buffer memory having copies of selected portions of the updatable information and the corresponding addresses and means for updating the information; and,
   a plurality of signal lines for said each one of said processing units, said signal lines connecting said processing units and said main storage for passing signals between said processing units and said main storage, without requiring access to said bus, said plurality of signal lines including:
      a bus use request line, for sending a bus use request signal from a processing unit of said processing units to said main storage in order to pass updated information from said processing unit to said main storage over said bus;
      a cancel request line for sending a cancel request signal from said main storage to each of said processing units other than said processing unit which sent said bus use request signal, in order to invalidate buffer memory information corresponding to the address of the updated information, wherein each of said processing units receiving said cancel request signal checks the buffer memory for an address corresponding to the address of the updated information and invalidates the information corresponding to that address, whereby invalidation of information in each of said processing units receiving said cancel request signal is obtained without the requirement of accessing the bus to send at least one of said bus use request signal and said cancel request signal.

2. The information processing apparatus as set forth in claim 1, said plurality of signal lines further including:
   a bus use accept line for sending a bus use accept signal from said main storage device to said processing unit which sent said bus use request signal, thereby allowing said processing unit to transmit an information update request onto said bus containing the updated information and the corresponding memory address, said bus use accept signal being sent simultaneously with said cancel request signal.

3. The information processing apparatus as set forth in claim 1 wherein each of said processing units further include:
   a cancel stack register for holding the memory address sent from the processing unit having updated information to the main storage device via said bus, after reception of said cancel request signal;
   an address register for receiving the memory address stored in said cancel stack register and for outputting a partial address wherein said partial address is obtained due to a lower bit portion address of said memory address;
   a comparator for comparing the partial address and the upper bit portion address and for outputting a coincidence output when the two addresses are in coincidence; and
   a valid flag area for receiving the coincidence output, whereby a valid flag associated with the address corresponding to the information in the buffer memory to be invalidated is reset to invalid, thus causing the corresponding information to be invalidated.

4. The information processing apparatus as set forth in claim 3 further including:
   a write access suppress line for sending a write access suppress signal, said suppress signal being sent when a predetermined number of memory addresses are stored in said cancel stack register, whereby sending of said suppress signal prevents said cancel stack register from overflowing.

5. The information processing apparatus as set forth in claim 3 further including:
   a buffer for obtaining data from said bus including said memory address corresponding to said updated information; and
   a data signal line for transferring said memory address from said buffer to said cancel stack register upon receipt of said cancel request signal.

6. An information processing apparatus comprising:
   a bus;
   a main storage device connected to said bus, said main storage device containing updatable information and addresses corresponding to said information;
   a plurality of processing units connected to said bus such that the processing units continuously monitor the bus, each one of the processing units including:
      a buffer memory constructed to store copies of selected updatable information and corresponding addresses, said buffer memory being further constructed to contain updated information based on the copies of the selected updatable information, wherein said updated information contained in said buffer memory is developed by a processing unit of the plurality of processing units with which said buffer memory is associated;
   a first bus use signal line connecting said main storage device to each of said processing units, for sending a first bus use signal when said main storage device is sending information and memory addresses over said bus, whereby during said first bus use signal said processing units are inhibited from accessing said bus;

a second bus use signal line interconnecting said processing units, for sending a second bus use signal among the processing units, whereby when any of the processing units sends said second bus use signal all other processing units are inhibited from sending information and corresponding memory addresses on said bus, such that only the processing unit which sent said second bus use signal outputs updated information and memory addresses to said bus.

7. The information processing apparatus as set forth in claim 6 wherein said processing units are arranged in a hierarchial priority manner, whereby a first processing unit has priority to use said bus over a second processing unit.

8. The information processing apparatus as set forth in claim 6 wherein said first bus use signal has priority over said second bus use signal.

9. The information processing apparatus as set forth in claim 6 wherein said each of said processing units further include:

a data signal line for transferring said memory address from said bus to said processing unit;

an address register for receiving said memory address from said data signal line and for outputting an upper bit portion address of said memory address;

an address array memory for outputting a partial address, wherein said partial address is obtained due to a lower bit portion address of said memory address;

a comparator for comparing the partial address and the upper bit portion address and for outputting a coincidence output when the two addresses are in coincidence; and, a valid flag area for receiving the coincidence output, whereby a valid flag associated with the address corresponding to the information in the buffer memory to be invalidated is reset to invalid, thus causing the corresponding information to be invalidated.

10. An information processing apparatus comprising:
a bus;
a main storage unit connected to said bus, said main storage device containing updatable information and addresses corresponding to said updatable information;
a plurality of processing units connected to said bus such that said processing units continuously monitor the bus, each one of said processing units including a buffer memory having updating information comprising copies of selected portions of the updatable information and the corresponding addresses and means for updating the information; and,
a plurality of signal lines for said each one of said processing units, said signal lines connecting said processing units and said main storage for passing signals between said processing units and said main storage, without requiring access to said bus;
wherein each of said processing units further comprises:
transmitting means for transmitting, onto said bus both the updating information in order to update the updatable information in said main storage unit and a memory address of said updating information;

receiving means for receiving the memory address of the updating information on the bus transmitted from the other processing unit;

detecting means for comparing the memory address received with the memory addresses in said buffer memory and for detecting whether the memory address received exists in said buffer memory; and invalidating means for invalidating the updating information of the memory address in said buffer memory based on the updating information and the memory address transmitted onto said bus when the existence of said updating information has been determined by said detecting means whereby, the processing units can obtain newly updated information which is equivalent for the plurality of processing units.

11. An apparatus according to claim 10, wherein one of said processing units further includes means for transmitting a signal indicative of an updating of the updatable information directly to other processing units through signal lines connected to said one of said processing units when said transmitting means transmits both said updating information and said memory address, and each of said other processing units have means for inhibiting the transmission of the updating information and the memory address thereof by said transmitting means in response to the signal indicative of the updating of the updatable information.

12. An apparatus according to claim 10, wherein said main storage unit further includes signal output means for outputting a signal indicative of an updating of the updatable information, wherein said receiving means of each of said processing units receives the memory address on the bus transmitted by one of other processing units in response to the signal indicative of the updating of the updatable information.

13. An apparatus according to claim 12, wherein each of said processing units further includes means for transmitting a bus use request signal for updating the storage information, the signal output means of said main storage unit transmits a bus use accept signal to one processing unit in response to the bus use request form the one processing unit and also outputs a signal indicative of an updating of said storage information to other processing units, and the transmitting means of said processing unit transmits onto the bus the updating information and the memory address thereof in response to said bus use accept signal.

14. An apparatus according to claim 13, wherein the signal output means of said main storage unit sends the bus use accept signal in response to the bus use request having higher priority from one processing unit to the one processing unit and a signal indicative of an updating of said updatable information in response to the bus use request having a lower priority from the other processing unit to the other processing unit when updating requests are simultaneously input from said processing units.

15. An apparatus according to claim 13, wherein the receiving means of each of the processing units has
a cancel stack register for storing the memory address having been received until the memory address is processed by said detecting means, checking means for checking whether an amount of said memory address stored in said cancel stack register exceeds a predetermined amount or not, and means for applying to the main storage unit such a suppressing signal that said main storage unit suppresses the transmission of the bus use accept signal to said processing units with respect to the bus use request from all of other processing units when it is detected by said checking means that an amount of said memory addresses stored in said cancel stack register exceeds the predetermined amount.

16. An apparatus according to claim 15, wherein said signal output means of said main storage unit suppresses the transmission of said bus use accept signal to all of other processing unit in response to said suppressing signal.

17. An apparatus according to claim 13, further includes signal transmission lines connected between said main storage unit and each of said processing units for transmitting said bus use request, but use accept signal and cancel request signal.

* * * * *

UNITED STATES PATENT AND TRADEMARK OFFICE
CERTIFICATE OF CORRECTION

PATENT NO. : 5,008,817

DATED : April 16, 1991

INVENTOR(S) : Masabumi Shibata, et al.

It is certified that error appears in the above-identified patent and that said Letters Patent is hereby corrected as shown below:

Claim 16, column 12, line 4, delete "unit" and insert therefor --units--.

Claim 17, column 12, line 10, delete "but" and insert therefor --bus--.

Signed and Sealed this

Eleventh Day of August, 1992

*Attest:*

DOUGLAS B. COMER

*Attesting Officer*       Acting Commissioner of Patents and Trademarks